Jan. 27, 1948. S. F. STELMACK 2,435,165
TROUBLE LIGHT FOR AUTOMOBILES
Filed June 6, 1945
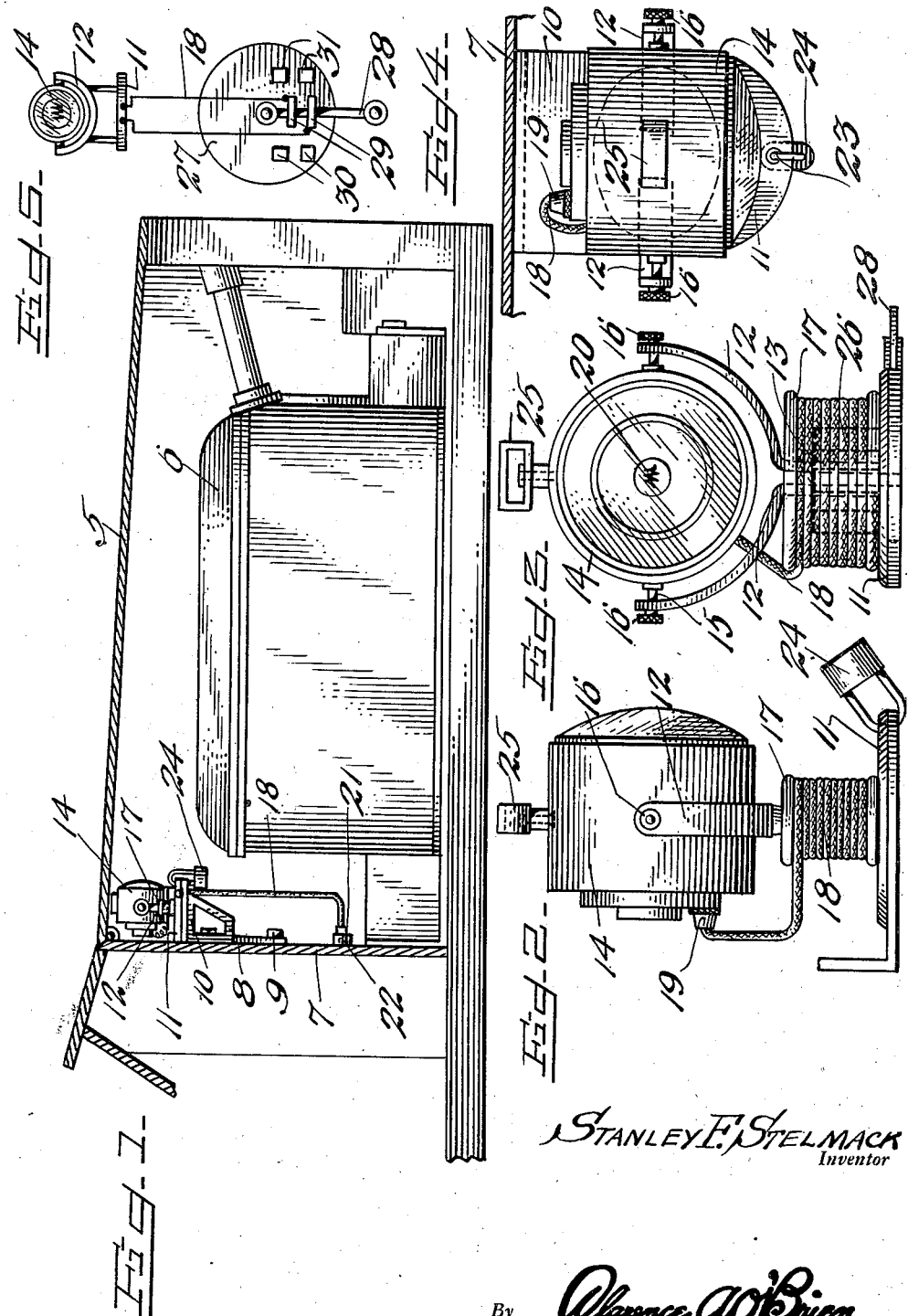
Stanley F. Stelmack
Inventor
By Clarence A. O'Brien
and Harvey B. Jacobson
Attorneys

# UNITED STATES PATENT OFFICE 2,435,165

TROUBLE LIGHT FOR AUTOMOBILES

Stanley F. Stelmack, Philadelphia, Pa.

Application June 6, 1945, Serial No. 597,831

1 Claim. (Cl. 240—8.18)

The present invention relates to new and useful improvements in trouble lights for automobiles and other motor driven vehicles and has for its primary object to provide means for supporting an electric lamp under the hood of the automobile in a position for illuminating the engine thereof.

An important object of the present invention is to provide a trouble light of this character embodying a lamp housing pivotally supported on a base so that the light may be adjusted in a desired position.

A further object of the invention is to provide a base for supporting the lamp and embodying a spool mounted on the base and around which the circuit wire for the lamp is adapted to be wound when not in use.

A still further object of the invention is to provide a device of this character of simple and practical construction, which is efficient and reliable in use, relatively inexpensive to manufacture, easy to install in position without necessitating any material changes or alterations in the construction of the automobile and which otherwise is well adapted for the purpose for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary longitudinal sectional view of an automobile hood showing the trouble light mounted in position therein.

Figure 2 is a side elevational view of the trouble light.

Figure 3 is a front elevational view thereof,

Figure 4 is a top plan view, and

Figure 5 is a diagram of the switch for connecting the lamp to an emergency source of power.

Referring now to the drawings in detail wherein for the purpose of illustration I have disclosed a preferred embodiment of the invention, the numeral 5 designates an automobile hood enclosing the engine 6.

A fire wall 7 is positioned in the rear of the hood and to the front side of which a bracket 8 is secured by means of the bolts or the like 9. The bracket includes a shelf 10 on which a lamp base 11 is removably positioned, the base having a yoke 12 rising therefrom and spaced above the base by means of a post or leg members 13 extending downwardly from the yoke.

A lamp housing 14 is pivotally mounted in the upper ends of the yoke 12 by means of trunnions 15 and secured in pivotally adjusted position by means of set screws 16.

A hollow spool or drum 17 is fixedly mounted on the post 13 and about which an extension electric cord 18 is adapted to be wound, the cord having a plug 19 at one end adapted for plugging in the rear of the lamp housing 14 to provide an electrical connection for the lamp 20 mounted therein and the other end of the cord 18 also has a plug 21 attached thereto for connection with an outlet or socket 22 mounted on the front side of the fire wall 7 and connected with the battery of the automobile.

One or more dry cell storage batteries 26 are mounted in the spool 17 and mounted in the bottom of the spool is a switch 27 operated by a lever 28 having spaced apart contacts 29 carried thereby for bridging pairs of contacts 30 or 31 connected respectively in the circuit for the battery of the vehicle or for the batteries 26 to thus enable use of the batteries 26 in an emergency should the vehicle battery fail.

When the lamp is not in use, the electric cord 18 may be wound on the spool or drum 17 so that the cord will not interfere with the running of the engine 6.

By plugging in the cord 18 in the socket or outlet 22 the lamp 20 may be energized and the lamp housing 14 tilted into a desired position for illuminating any part of the engine.

The base 11 may also be removed from the bracket 10 so that the lamp may be used for working on other parts of the automobile, such as the tires or the like.

The base 11 is formed with an opening 23 adapted for registering with an opening in the shelf 10 of the bracket 8 whereby to receive a padlock 24 in order to lock the lamp on the bracket against theft or unauthorized use.

A handle 25 is swivelly attached on top of the lamp housing 14 to facilitate handling thereof and to hold the lamp when winding the electric cord on the spool.

The lamp is preferably connected in the parking light circuit on the automobile with a switch (not shown) of conventional construction adapted to be moved into its closed position by a raising of the engine hood, the lamp and switch being connected in series with the parking light so that when the parking light is on and the hood raised the trouble light will be energized.

In view of the foregoing description taken in connection with the accompanying drawings it is believed that a clear understanding of the construction, operation and advantages of a trouble light of this character will be quite apparent to those skilled in the art. A more detailed description thereof is accordingly deemed unnecessary.

It is to be understood, however, that even though I have herein shown and described a preferred embodiment of my invention that the same is susceptible to certain changes fully comprehended by the spirit of the invention as herein described, and the scope of the appended claim.

Having thus described the invention, what I claim is:

A trouble light for an automobile comprising a base, means for supporting the base on a part of the automobile, a post arising from the base and having an upper end yoke, a lamp housing pivoted in the yoke, a battery on the base, an extension cord having one end electrically connected to the lamp in the housing and its other end for connection in the electric system of the automobile, a switch on said base connected to the extension cord and arranged to cut in the lamp with either the battery or said system, and a spool for winding said cord thereon mounted on the post to rest on the base and surrounding said post and battery.

STANLEY F. STELMACK.

REFERENCES CITED

The following references are of record in the file of this patent:

UNITED STATES PATENTS

| Number | Name | Date |
|---|---|---|
| 1,330,974 | Bauman et al. | Feb. 17, 1920 |
| 1,880,730 | Bogue | Oct. 4, 1932 |
| 2,168,118 | Dickson | Aug. 1, 1939 |
| 2,233,377 | Talbot | Feb. 25, 1941 |